United States Patent [19]

Mageau et al.

[11] Patent Number: 4,994,962
[45] Date of Patent: Feb. 19, 1991

[54] VARIABLE LENGTH CACHE FILL

[75] Inventors: Paul Mageau, Townsend, Mass.;
John S. Yates, Nashua, N.H.

[73] Assignee: Apollo Computer Inc., Chelmsford, Mass.

[21] Appl. No.: 264,260

[22] Filed: Oct. 28, 1988

[51] Int. Cl.⁵ .............................................. G06F 13/00
[52] U.S. Cl. .................................. 364/200; 364/243; 364/243.4; 364/243.41
[58] Field of Search ... 364/200 MS File, 900 MS File

[56] References Cited

U.S. PATENT DOCUMENTS

| | | | |
|---|---|---|---|
| 4,189,770 | 2/1980 | Gannon et al. | 364/200 |
| 4,315,312 | 2/1982 | Schmidt | 364/200 |
| 4,503,501 | 3/1985 | Coulson et al. | 364/200 |
| 4,586,130 | 4/1986 | Butts et al. | 364/200 |
| 4,603,380 | 7/1986 | Easton et al. | 364/200 |
| 4,654,782 | 3/1987 | Bannai et al. | 364/200 |
| 4,780,808 | 10/1988 | Moreno | 364/200 |

*Primary Examiner*—David Y. Eng
*Attorney, Agent, or Firm*—Weingarten, Schurgin, Gagnebin & Hayes

[57] ABSTRACT

A method and apparatus for selectively filling a cache memory with a variable number of data words in response to the size and type of data transfer requested by the processor associated with the cache. According to the present invention a cache fill of either 16 or 64 bytes are provided. If there is a cache miss and an 8 byte word data transfer as requested, the larger fill is provided, similarly, if the 8 byte word data transfer is not requested, the shorter block of data is provided, resulting in enhanced performance over a fixed length cache fill.

10 Claims, 1 Drawing Sheet

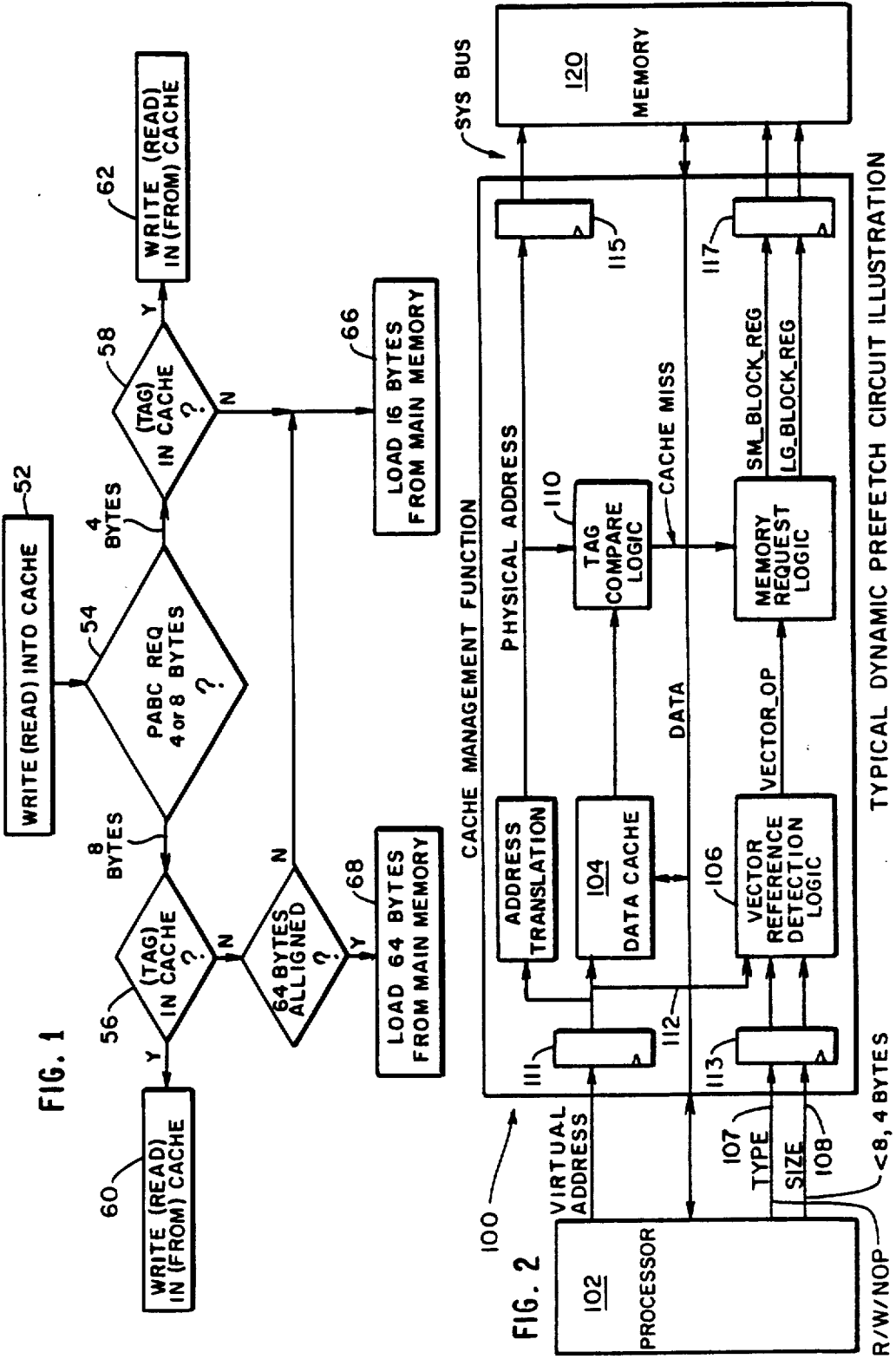

VARIABLE LENGTH CACHE FILL

FIELD OF THE INVENTION

The present invention relates to high speed computer processors, in particular, to computer processors having cache data and instruction stores.

BACKGROUND OF THE INVENTION

Choosing the parameters of a cache fill strategy that will deliver good performance requires knowledge of cache access patterns.

Long cache fills have the advantage that actual bus bandwidth rises towards the theoretical peak as read size increases. But once the read size exceeds the bus width satisfying the read requires multiple bus cycles and thus may increase cache miss tendency.

If the code is making long sequential sweeps through one or more data structures that are contiguous in memory (e.g., the sort of code that benefits most directly from a "vectorizing" compiler and vector hardware) then typically a long cache fill will be desirable. The extremely high locality of the stream of data references means that there is a commensurately high probability that the additional data read during a long cache fill will actually be used. Finally, because the performance of such "vector" applications is frequently a direct function of memory bandwidth the improved bus utilization translates into increased application speed.

When there is more randomness in the stream of data references a long cache fill may actually degrade performance. There are at least two reasons for this. Because of the lower probability that the additional data will ever be used the larger number of bus cycles necessary to complete a long cache fill may actually lead to an increased average memory load latency. The larger fill size also decreases the number of replaceable cache lines and may therefore hurt performance by increased thrashing in the use of those lines. In other words, it increases the probability that the process of servicing one cache miss will expunge from the cache the contents of some other line that would have taken a hit in the near future. When such behavior becomes especially severe it is termed "thrashing in the cache".

Thus, a conflict exists in providing a system which services the rather predictable needs of well behaved "vector" applications and the chaotic needs of more general computations.

SUMMARY OF THE INVENTION

According to the present invention, two distinct cache fill sequences of 16 bytes and 64 bytes are provided and chosen according to the size and address alignment of the data requested by the associated processor. No data is transferred from main memory if there is a cache hit. If there is a cache miss, and either a quadword is not requested or a quadword not aligned to a multiple of 64 bytes is requested, a shorter block of 16 bytes is transferred from main memory. If there is a cache miss and a quadword is requested, a longer block of 64 bytes is transferred to the cache from main memory, in this context, a quadword is 8 bytes.

BRIEF DESCRIPTION OF THE DRAWINGS

These and other features of the present invention will be better understood by reading the following detailed description, taken together with the Drawings, wherein:

FIG. 1 is a flow chart showing the operation of one embodiment of the present invention; and FIG. 2 is a block diagram of one embodiment of the present invention operable according to the flow chart of FIG. 1.

To keep the mechanics of cache management simple, cache lines must adhere to the same natural (or other) word alignment strategy as all other aspects of the architecture as defined in co-pending, commonly assigned U.S. patent application Ser. No. 07/255,105 entitled METHOD AND APPARATUS FOR CONCURRENT DISPATCH OF INSTRUCTIONS TO MULTIPLE FUNCTIONAL UNITS, filed Oct. 7, 1988, incorporated by reference.

In recognition of the fact that opcode space is a precious commodity and of the desirability of making the presence of a variable length cache fill mechanism totally transparent to a compiler or an assembly language programmer, the method and apparatus according to the present invention, when a cache miss occurs chooses an appropriate fill size.

DETAILED DESCRIPTION OF THE INVENTION

According to the operation of one embodiment 100 of FIG. 2 illustrated in the flow chart 50 of FIG. 1, when the processor 102 requests a data read or write 52 into cache 104, the vector reference detection logic 106 responds to the type 107 (e. g., read, write, no-op) and data size 108 signals which indicates (54) if a 4 or 8 byte transaction is requested by the processor 102.

If the data is in the cache 104 as indicated by a cache hit (56, 58) provided by a positive tag comparison 110, the transaction between the processor 102 and cache 104 proceeds (60, 62) without data transfer from the main memory 120.

Referring to FIG. 1, if the tag of the processor 102 requested data was not found (56, 58) by the tag compare logic, and if the size of the processor requested data is 4 bytes, then a block of 16 bytes is loaded 66 into the cache from main memory 120.

As can be seen in FIG. 1, if the processor requested data is not in the cache 104 as indicated by the tag compare logic 110, the vector reference logic determines (64) if the requested data address 112 is 64 byte aligned (aligned to an integer multiple of 64 bytes,) if so, then 64 bytes of data is transferred (68) from main memory 120 to the cache 104. If the processor requested data is not in the cache and if the requested data address is not a memory address aligned (i.e. corresponding) to an integer multiple of 64 bytes, then only a 16-byte data block is loaded from memory into cache. Registers 111, 113, 115 and 117 provide temporary storage of the command, address and data signals.

Two properties of the above-described system architecture and process according to the present invention are particularly significant for several reasons. First the architecture may be viewed as incorporating "an address formation and sequencing unit, and an executed unit". This structure and the availability of both integer and floating point operations in the execute unit means that there is an obvious strategy for decomposing vector primitives. This strategy will work independent of the type of data being processed. Second the present architecture provides selective 8 byte transfers to and from an even/odd pair of floating point registers. Since, as mentioned above, vector loops tend to be limited by the rate at which operands can be made available from and results returned to memory using these 8 byte loads and stores to move two 4 byte data (2 single precision floating point values or 2 long word integers) in a single cycle makes an enormous difference in the performance of loops operating on vectors of 4 byte objects. Thus on the system architecture according to the present invention, there is a very high probability that any "vector-like" loop will be implemented in terms of 8-byte loads and stores.

Finally, since it is typically only vector loops that would benefit from long cache fill sequences and since the vast majority of all such loops process memory in ascending order we wanted to recognize the possibility for a long fill only when a cache miss occurred on an address corresponding to the beginning of a long cache line. This avoids excessive false triggering of the long fill in more general code while still permitting it under exactly those conditions when it will do the most good.

Thus the present invention of providing a long fill for a cache miss that occurs while performing an 8 byte load from a long line (64 byte) boundary provides significant improvement over a single length cache fill.

The scope of the present invention further includes an implementation which would support vector access to descending locations. This would be done by enabling a long fill during a cache miss on an 8 byte load from the first 8 bytes or the 8 bytes of a 64 byte line.

Details of related bus structure and methods are provided in co-pending, commonly assigned U.S. patent application Ser. No. 07/263,711 entitled A QUASI-FAIR ARBITRATION SCHEME WITH DEFAULT OWNER SPEEDUP, filed Oct. 25, 1988 and incorporated by reference; details of related tag structure and methods are provided in APOLL-ll5XX, entitled DUPLICATE TAG STORE PURGE QUEUE, filed concurrently herewith and also incorporated by reference. Moreover, modifications and substitution of the above disclosed invention are within the scope of the present invention, which is not limited except by the claims which follow.

What is claimed is:

1. A method of selectively receiving and storing data blocks of selected lengths of data from a main memory, into a cache memory said method comprising the steps of:

requesting a transfer of data between a processor and a cache memory, the data having a corresponding indicia and at least one of a first and a second length;

determining if said indicia corresponding to the data to be transferred indicates the presence of the data in said cache;

determining if a virtual address transferred with the data corresponds to a physical main memory location that is an integer multiple of a given number of bytes, if said data is not present in said cache;

selectively transferring from said main memory to said cache a data block of one of a third and a fourth length in response to determining if said virtual address transferred with the data corresponds to a physical main memory location that is an integer multiple of said given number of bytes, wherein said second length is greater than said first length, said fourth length is greater than said third length, said third length is a higher multiple of said second length, and said data block of said fourth length is transferred into said cache memory if data of said second length is requested and if said virtual address transferred with the data corresponds to a physical main memory location that is an integer multiple of said given number of bytes.

2. The method of claim 1, wherein said first and second length comprise up to 4 bytes and 8 bytes, respectively, and said third and fourth length comprise 16 and 64 bytes, respectively.

3. The method of claim 1, further including the step of transferring from said main memory data having said third length if said first length of data is requested and is not present in said cache.

4. Apparatus for selectively loading data to a cache memory from an associated main memory, comprising computer means for requesting a selected length data transfer with said cache said selected length data transfer being one of a first and a second number of bytes;

means for determining the presence of said selected length data in said cache;

means for determining if a virtual address transferred with the data corresponds to a physical main memory location that is an integer multiple of a given number of bytes;

means for selectively transferring a data block from said associated main memory to said cache if said selected length data is not in said cache, said data block being transferred to said cache having one of a third and a fourth length, wherein said second length is greater than said first length, said fourth length is greater than said third length, said third length is a higher multiple of said second length, said fourth length of data is selectively transferred if said second length is requested and is not present in said cache and if said virtual address transferred with the data corresponds to a physical main memory location that is an integer multiple of said given number of bytes.

5. The apparatus of claim 4, wherein said first, second, third and fourth lengths comprise 4, 8, 16 and 64 bytes respectively and said given number of bytes is 64.

6. Apparatus for selectively receiving and storing from a main memory into a cache memory, data of at least one of a first block size and a second block size, said apparatus comprising:

means for requesting a transfer of data between a processor and a cache memory, the requested data being of one of a first data length and a second data length;

means for determining that the requested data is of said first data length;

means for determining that the requested data is of said second data length;

means for determining that the data of said first data length and alternatively of said second data length does not reside in said cache memory;

longfill means for determining that a first address transferred with the data of said second data length is an integer multiple of a number of bytes of said second block size;

means for loading from main memory into cache memory a data block of said first block size in response to said means for determining that the requested data is of said first data length and alternatively in response to said means for determining that the requested data is of said second data length and in response to said longfill means; and means for loading from main memory into cache memory a data block of said second block size in response to said means for determining that the requested data is of said second data length and in response to said longfill means.

7. The apparatus of claim 6 wherein said first data length is equal to four bytes.

8. The apparatus of claim 6 wherein said second data length is equal to eight bytes.

9. The apparatus of claim 6 wherein said first block size equals 16 bytes.

10. The apparatus of claim 6 wherein said second block size equals 64 bytes.

* * * * *

UNITED STATES PATENT AND TRADEMARK OFFICE
CERTIFICATE OF CORRECTION

PATENT NO. : 4,994,962
DATED : February 19, 1991
INVENTOR(S) : Paul Mageau, John S. Yates It is certified that error appears in the above-identified patent and that said Letters Patent is hereby corrected as shown below:

Column 3, line 32, "No. 07/263,711" should read --No. 07/262,574--;

Column 3, line 36, delete "APOLL-115XX" insert therefore --co-pending, commonly assigned U.S. Patent Application Serial No. 07/263,711--.

Signed and Sealed this

Ninth Day of February, 1993

Attest:

STEPHEN G. KUNIN

Attesting Officer

Acting Commissioner of Patents and Trademarks